United States Patent
Bauer et al.

(10) Patent No.: US 11,518,518 B2
(45) Date of Patent: Dec. 6, 2022

(54) STOWAGE AND REMOVAL SYSTEM FOR ROLLABLE CONTAINERS IN A VEHICLE, AND A VEHICLE HAVING SUCH A SYSTEM

(71) Applicant: Airbus Operations GmbH, Hamburg (DE)

(72) Inventors: Michael Bauer, Hamburg (DE); Hans-Gerhard Giesa, Hamburg (DE); Roland Lange, Hamburg (DE); Andreas Wietzke, Hamburg (DE)

(73) Assignee: AIRBUS OPERATIONS GMBH, Hamburg (DE)

( * ) Notice: Subject to any disclaimer, the term of this patent is extended or adjusted under 35 U.S.C. 154(b) by 289 days.

(21) Appl. No.: 16/838,325

(22) Filed: Apr. 2, 2020

(65) Prior Publication Data

US 2020/0317345 A1 Oct. 8, 2020

(30) Foreign Application Priority Data

Apr. 3, 2019 (DE) .......................... 102019108747.3

(51) Int. Cl.
*B64D 11/04* (2006.01)
*B64D 11/00* (2006.01)

(52) U.S. Cl.
CPC .......... *B64D 11/04* (2013.01); *B64D 11/0007* (2013.01); *B64D 2011/0046* (2013.01)

(58) Field of Classification Search
CPC ............ B64D 2013/0629; B64D 11/04; B64D 11/0007; B64D 9/003
See application file for complete search history.

(56) References Cited

U.S. PATENT DOCUMENTS

| 5,322,244 | A | * | 6/1994 | Dallmann | .......... B64D 11/0007 244/118.1 |
| 5,465,660 | A | * | 11/1995 | Conti | ..................... B64D 11/04 100/48 |
| 6,454,208 | B1 | * | 9/2002 | Nervig | ................... B64D 9/003 244/118.6 |
| 9,221,541 | B2 | * | 12/2015 | Durand | ............. B64D 11/0007 |
| 9,821,911 | B2 | | 11/2017 | Wallbott et al. | |
| 2008/0001031 | A1 | * | 1/2008 | Doebertin | .............. B64D 11/04 244/118.1 |

(Continued)

FOREIGN PATENT DOCUMENTS

| DE | 102017128345 A1 * | 5/2019 |
| WO | 2014125046 A1 | 8/2014 |
| WO | 2016034531 A1 | 3/2016 |

*Primary Examiner* — Joshua J Michener
*Assistant Examiner* — Cindi M Curry
(74) *Attorney, Agent, or Firm* — Greer, Burns & Crain, Ltd.

(57) ABSTRACT

A stowage and removal system for an accommodation space for storing rollable containers in a vehicle is provided. It preferably has a rail system in the floor region of the accommodation space, on which rail system a transfer plate is movable, which transfer plate can assume a storage position and an insertion and removal position for the container. The storage position of the container is provided with its rear wall in the region of the rear wall of the accommodation space. The insertion and removal position is provided in the region of an insertion opening, arranged oppositely in relation to the rear wall, for the insertion and removal of a container into the accommodation space.

10 Claims, 13 Drawing Sheets

(56) References Cited

U.S. PATENT DOCUMENTS

| | | | |
|---|---|---|---|
| 2008/0136299 A1* | 6/2008 | Peurifoy | B64D 11/0007 312/237 |
| 2011/0006496 A1* | 1/2011 | Knoppers | B64D 11/0007 312/352 |
| 2015/0367942 A1 | 12/2015 | Parry et al. | |
| 2020/0339262 A1* | 10/2020 | Claflin | B64D 11/0007 |

* cited by examiner

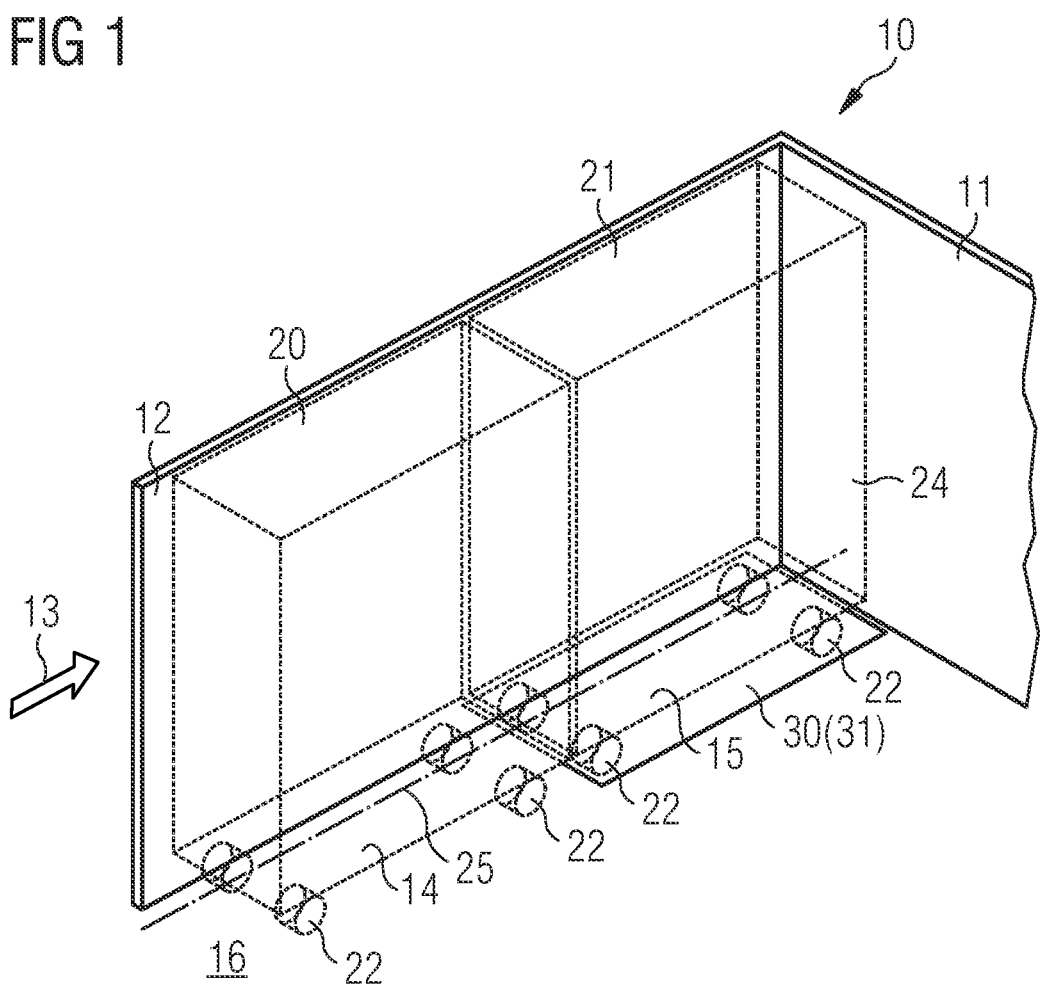

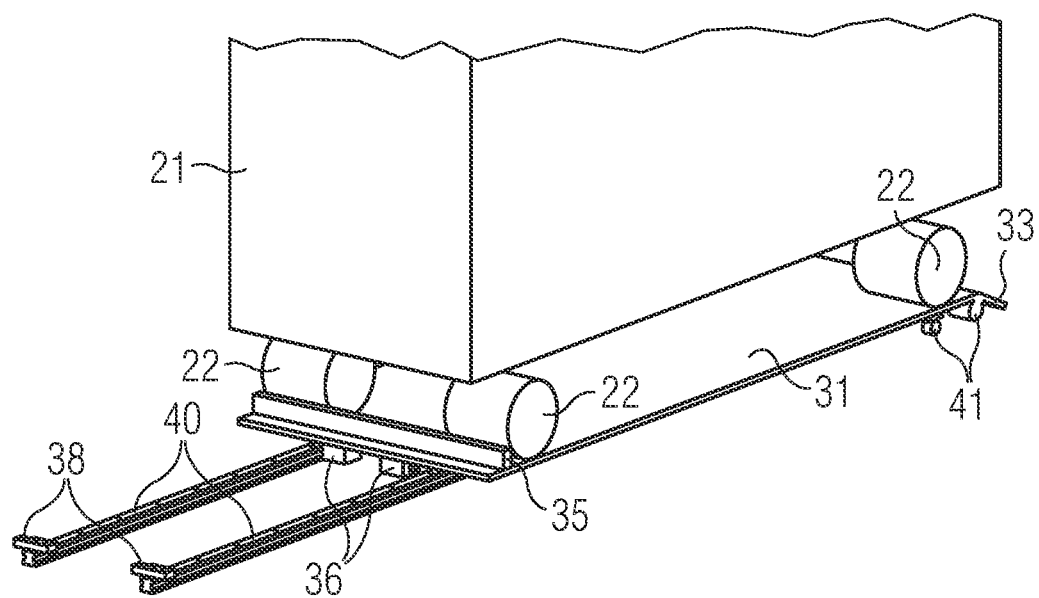

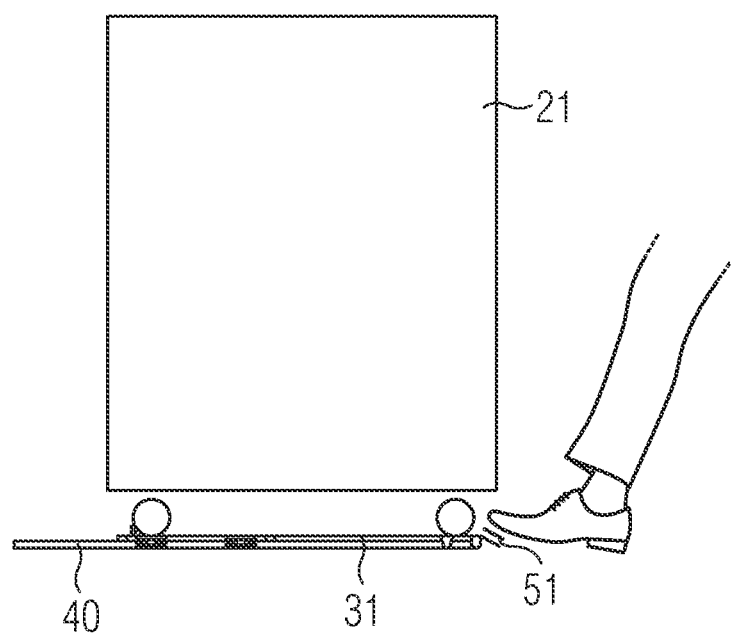
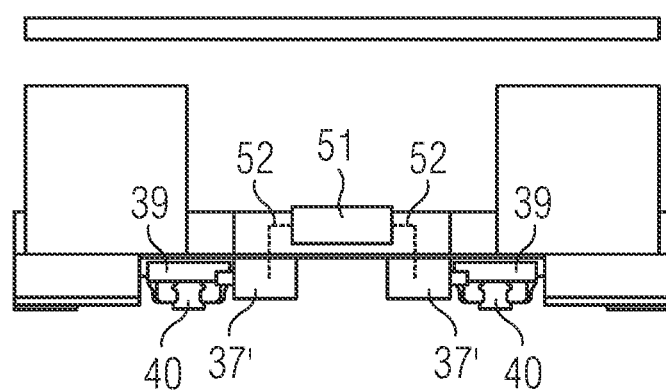

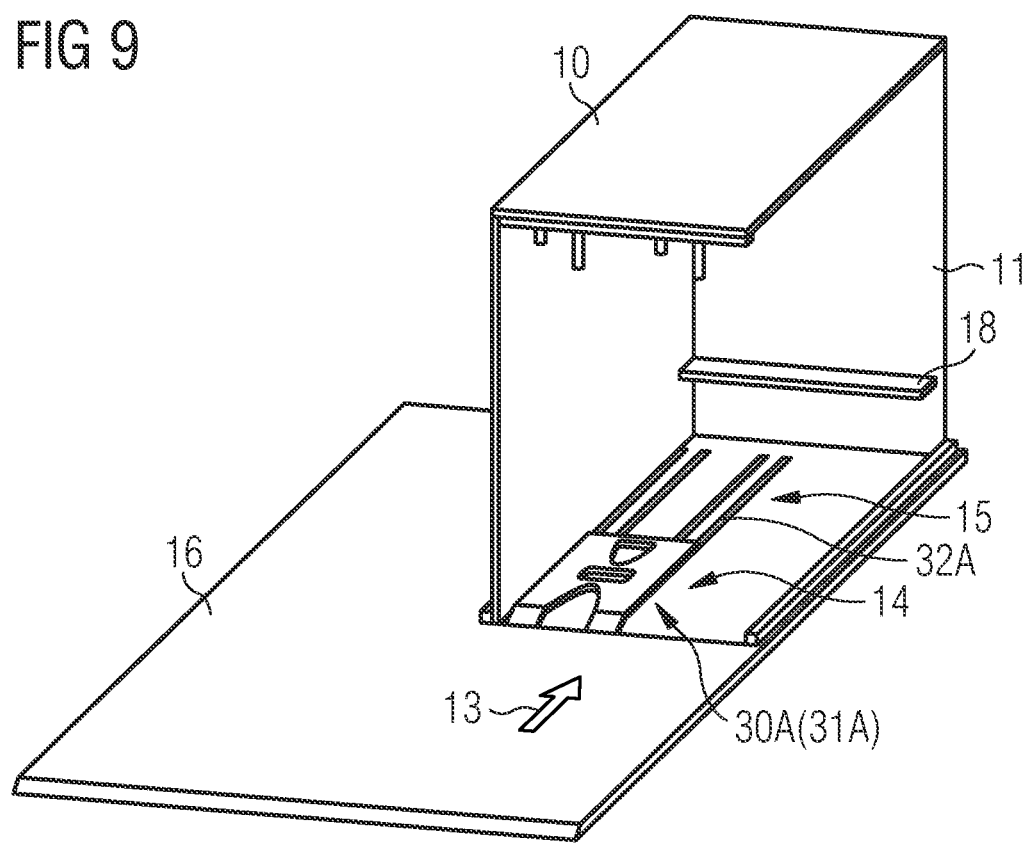
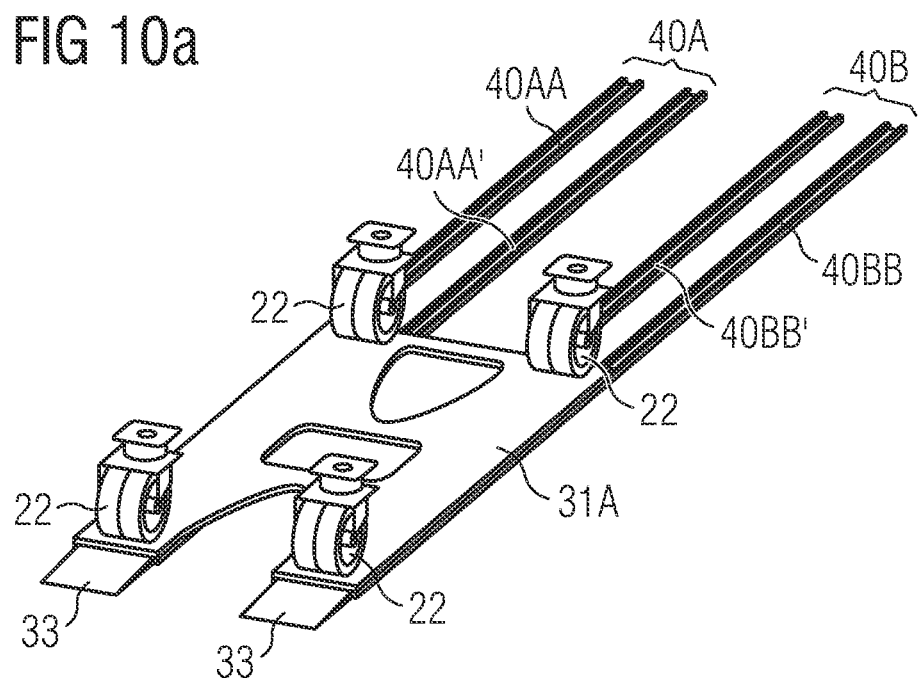

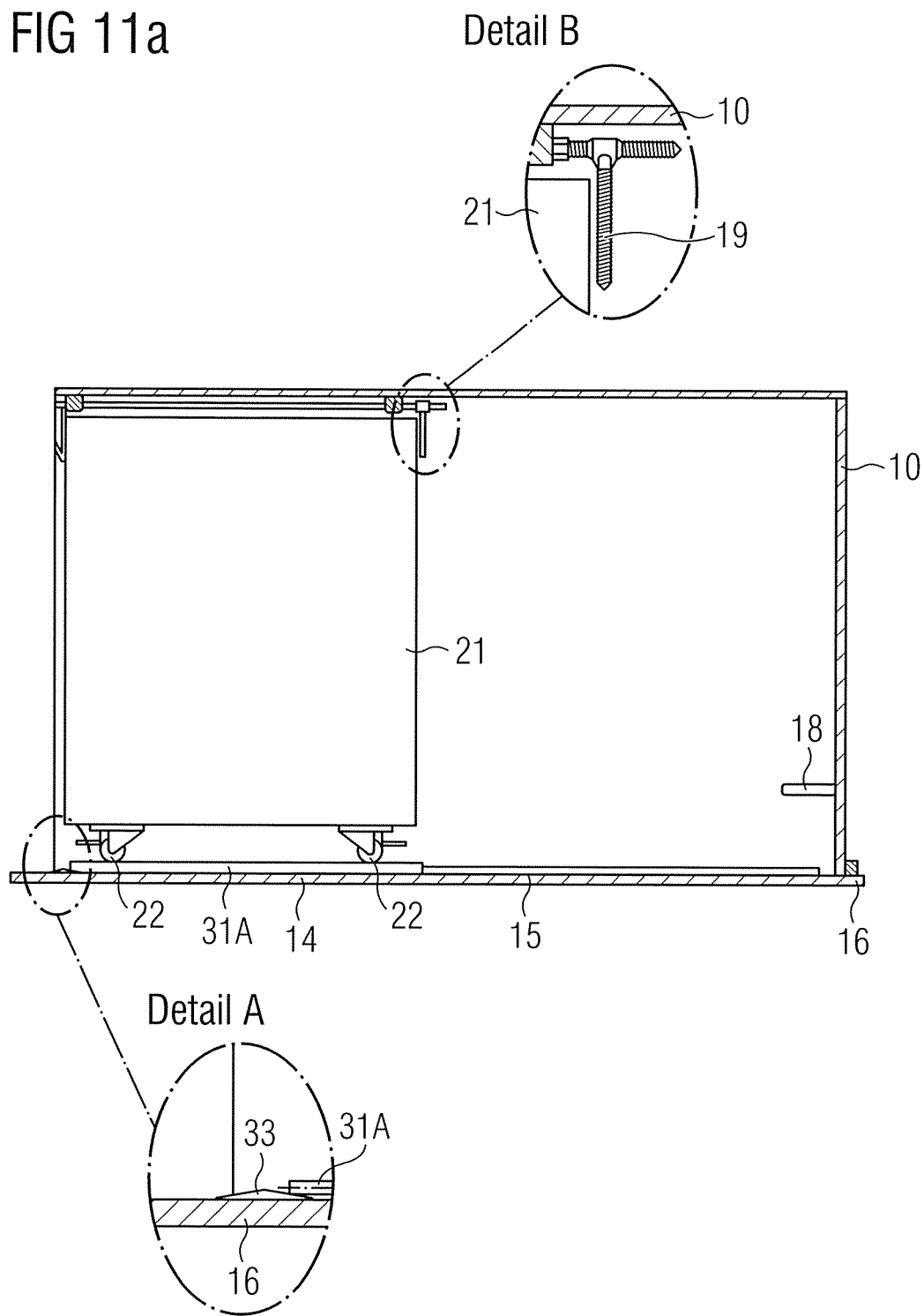

STOWAGE AND REMOVAL SYSTEM FOR ROLLABLE CONTAINERS IN A VEHICLE, AND A VEHICLE HAVING SUCH A SYSTEM

CROSS-REFERENCES TO RELATED APPLICATIONS

This application claims the benefit of the German patent application No. 102019108747.3 filed on Apr. 3, 2019, the entire disclosures of which are incorporated herein by way of reference.

FIELD OF THE INVENTION

The invention relates to a stowage and removal system for rollable containers in a vehicle, and to a vehicle having such a system.

BACKGROUND OF THE INVENTION

Vehicles which serve for transporting a multiplicity of passengers are commonly equipped with cabins with passenger seats, one or more on-board toilets and optionally one or more galleys. In particular, in the context of the design of galleys in passenger aircraft to be more compact, concepts exist in the case of which parking locations for trolleys are utilized in which multiple trolleys are arranged one behind the other. This commonly relates to the use of trolleys according to ATLAS, ARINC or KSSU standards, and the combined use of a trolley with full structural depth ("full size trolley") and of a trolley with a halved structural depth ("half size trolley") or two trolleys with full structural depth (two "full size trolleys"). It is also the case for supply containers which must be stored as boxes in the galley that, owing to the structural depth for the storage space, stowage of two boxes or more one behind the other can be possible.

For the removal of trolleys from such a parking location, it is commonly the case that a handle situated at a top side is gripped by a user and is pulled out of the parking location. For this purpose, the trolley is equipped with rollers which are provided for the movement within the galley area and also for the movement of the trolley in the aircraft aisle from seat row to seat row for the serving process within the aircraft cabin. For trolleys on the rear parking locations, a removal device is necessarily provided. In particular, if a full size trolley is parked in a rear parking location, it is possibly difficult for the flight attendants, in terms of a relatively high expenditure of force and also in terms of the accessibility, to move the full size trolley out of the rear parking location.

Such removal devices for trolleys are known from WO 2016 034 531 A1 or also WO 2014 125 046 A1. Here, a forward and backward movement of the trolley in the parking location space is provided by means of rods and engagement devices with respect to the trolley body. For catering containers in boxes, too, a removal from the rear parking location by means of cable systems is known. However, the operability and handleability of a trolley/of a box specifically for parking locations arranged one behind the other can be improved.

SUMMARY OF THE INVENTION

To make galleys even more compact, it could be expedient for catering containers such as trolleys or also boxes to be arranged one behind the other in an accommodation space. This is, however, not optimal in terms of handleability because a rear trolley or a rear box can be reached by on-board personnel only with great difficulty, because it is situated at a relatively large distance from an insertion opening of the parking location.

It is consequently an object of the invention to propose a device or a galley with which catering containers arranged one behind the other in an accommodation space can be easily handled by on-board personnel such that, in particular, catering containers arranged at the rear in an accommodation space can be reached as easily as possible.

This object is achieved by means of a stowage and removal system for catering containers in a vehicle having the features of independent Claim 1. Advantageous embodiments and refinements emerge from the dependent claims and from the following description. The use of such a stowage and removal system is not restricted to catering containers, and it is also possible for containers for other purposes to be moved using the stowage and removal system according to the invention.

A stowage and removal system for containers in a vehicle is proposed, which system substantially has a rail system in the floor region and can move a supply container from a storage position to a removal position. For this purpose, the system has a rail system in the floor region of the accommodation space. The floor may, for example, be a floor element of the accommodation space or else a vehicle floor in which the accommodation space is arranged. The rail system may be fastened on the floor or else may be integrated in the floor. The selection of the corresponding fastening to the floor or integration into the floor is made with the aim of minimizing the overall structural height of the rail system in order to allow for the structural conditions of the accommodation space, which are adapted to the dimensions of the corresponding catering containers.

Furthermore, a transfer plate is provided which is movable on the rail system and which can assume a storage position and a removal position for the catering container. The storage position of the catering container with its rear wall is provided adjacent to the rear wall of the accommodation space. The removal position is provided in the region of an insertion opening for the insertion and removal of a catering container into the accommodation space. This insertion opening is formed oppositely in relation to the rear wall of the accommodation space.

The rail system has guide rails, preferably linear systems or else telescopic guide rails, which are arranged in the region of the storage position on the floor in the movement direction of the transfer plate. The linear systems may be designed, for example, as guide rails which correspond with movement bodies such as running rollers or with rail bodies composed of ball bearings or rolling bodies. Movement bodies in the form of sliding bodies may also be used. For example, linear guides with plastic plain bearings may be used. Such movement bodies are arranged on the transfer plate.

In one preferred embodiment, the accommodation space is designed for accommodating at least two catering containers arranged one behind the other, and the rear catering container is positioned on the transfer plate.

The accommodation space can consequently be filled with relatively large rollable containers in a very convenient manner, and, in particular in the case of use in a cabin of a passenger aircraft, permits the very space-saving, spatially economical accommodation of trolleys one behind the other.

After a front container, which is arranged at the insertion opening, has been removed in the conventional manner, it is possible, through the use of a removal and stowage system, to remove the rear container which is arranged considerably spaced apart from the insertion opening in the interior of the accommodation space.

The stowage and removal system according to the invention is preferably provided for supply containers, for example trolleys, which are arranged on the rear parking locations of a galley in a vehicle. In particular, if a full size trolley is parked in a rear parking location, it is made very much easier for the flight attendants to position the relatively heavy container into an easy-to-reach access region by means of the transfer plate and easily convey it out of the rear parking location.

The rear wall, arranged opposite the insertion opening, of the accommodation space is a rear boundary of a parking location in the accommodation space, against which a rearmost container abuts or with which a rearmost container comes into contact or which is adjoined by a rearmost container. This corresponds to the storage position of the supply container. The size and shape of the container may be selected in accordance with the requirements in the vehicle. If the vehicle is realized as a passenger aircraft, the use of trolleys according to relevant standards, for example the ATLAS standard, is expedient. The advantages according to the invention are furthermore particularly apparent if the rollable containers have a depth extent greater than 30 to 40 cm. In particular in the case of a full size trolley, which approximately has a length of 80 to 82 cm.

The transfer plate is equipped with at least one locking device which realizes the locking of the transfer plate for the insertion and removal position. Provision may also additionally or optionally be made for fixing in the storage position, that is to say, the container adjacent to the rear wall, by fixing of the transfer plate in its position there. For this purpose, the locking device may have locking elements, preferably front and rear locking elements. These may be designed in any desired manner which permits easy locking and easy release for the removal of the respective container. The locking may be realized, in particular, by means of a movable catch element which has a positive locking action and which corresponds with a corresponding form feature of the container or of the transfer plate.

The at least one locking device may preferably be mechanically or electromechanically actuatable. Automatic locking and/or unlocking is also conceivable. For example, when the insertion and removal position is reached, an automatic locking of the transfer plate in that position occurs, and the transfer plate is actively unlocked for the movement into the storage position. An operator control element which is connected to the locking device may be arranged, in particular, on a side facing toward the user. In this way, it is made very easily possible for a user to release the locking device or ascertain the present locking state. The specific design of the operator control element may be dependent on the type of locking device. Tension, thrust and rotary elements are expedient which, by means of a linkage or some other device, transmit a desired axial, rotational or combined axial and rotational movement to the first locking device.

For example, a foot-operated pedal may be provided which activates the corresponding locking elements via cable pulls. Alternatively, the locking device may be activated and triggered via signal lines or else wirelessly. In a further alternative embodiment, a hand crank may engage into a corresponding lock element and trigger the actuation of the locking. It is additionally also conceivable to move the transfer plate by means of the crank by virtue of thrust force or tensile force acting on the transfer plate.

A core component of the stowage and removal system according to the invention is the transfer plate, which accommodates the catering container and can be moved between the storage position and the removal position. In order to permit secure storage of the catering container on the transfer plate, at least one positioning device is provided. This is preferably in the form of a stop in the rear region of the plate or in the form of a catch element at a corresponding position in the accommodation space.

Furthermore, the stowage and removal system may have run-on ramps which make it easier for the rollable catering containers to run on for the purposes of overcoming the height difference between the floor and the transfer plate. The run-on ramps may also be provided at a corresponding position on the floor, which run-on ramps then, in operative connection with the transfer plate positioned at the correct location, enable the rollable catering container to run on and run off. This is alternatively also possible in combination with the run-on ramps on the transfer plate.

In one advantageous refinement, the run-on ramps are arranged at a face side of the guide rails at a corresponding position on the floor.

The rail system furthermore preferably has two guide rails which run parallel to the outer edges of the transfer plate and which are provided below the transfer plate. The guide rails are thus covered by the transfer plate in the storage position.

The guide rails may be positioned such that they run in each case approximately vertically below the transport rollers, and, in each case, one cover element is provided, as running surface for the transport rollers, in the region of the top side of the guide rails at least in the accommodation space of the front parking location.

In one advantageous refinement, the respective guide rail is configured with two longitudinal rails which run parallel, wherein, between the longitudinal rails, a bearing and running body acts as cover element and as running surface for the rollers. Thus, a run-on of the front container with its transport rollers into the accommodation space in the region of the guide rails is ensured. The guide rails thus also do not pose an obstruction even in the front region of the accommodation space, preferably for the front parking location of the container, and the handling and insertion and removal of the front container, too, is possible despite rails positioned there.

In other words, the guide rails may be formed as linear guides which are each equipped with a rail element and a movement body, wherein the rails are fixed on the floor of the accommodation space or the aircraft floor and the respective movement element is arranged on the transfer plate.

The movement of the transfer plate is possible with only a low handling force owing to the selection of free-running rail and/or guide systems. For the movement of the transfer plate from the removal position to the storage position or vice versa, it may thus suffice for the movement of the transfer plate to be actuated by means of actuators with motor assistance by means of an operator control element. A manual movement of the transfer plate may alternatively likewise be considered if only low handling forces are required and the access region for an operating person is sufficient. It is also possible for linkages to be provided which facilitate the access to the transfer plate and possibly furthermore perform the actuation of the locking device. Further it may be an option that the operator control element carry out a wireless control of the actuators for the movement of the transfer plate as well as a status indication for the position of the transfer plate.

The invention furthermore relates to a vehicle having a cabin and having a cabin monument which is situated therein and which has a stowage and removal system according to the above description.

BRIEF DESCRIPTION OF THE DRAWINGS

Further features, advantages and possible uses of the present invention will emerge from the following description of the exemplary embodiments and from the figures. Here, all of the features described and/or illustrated in the figures form the subject matter of the invention individually and in any desired combination, even independently of the combination of said features in the individual claims or the back-references thereof. Furthermore, in the figures, the same reference signs are used for identical or similar objects.

FIG. 1 shows a three-dimensional illustration of an accommodation space with two supply containers which are arranged one behind the other on two trolley parking locations arranged one behind the other.

FIG. 5 shows the supply container with the rear locking device.

FIGS. 7a and 7b show a second embodiment of a locking device with electromechanical actuation.

FIG. 9 shows the accommodation space with a stowage and removal system according to the invention in a further embodiment.

FIGS. 10a to 10c show the stowage and removal system as per FIG. 9 in different loading and parking locations.

FIGS. 11a to 11c show the accommodation space as per FIG. 9 in different loading and parking locations.

DETAILED DESCRIPTION OF THE PREFERRED EMBODIMENTS

Figure 2A:
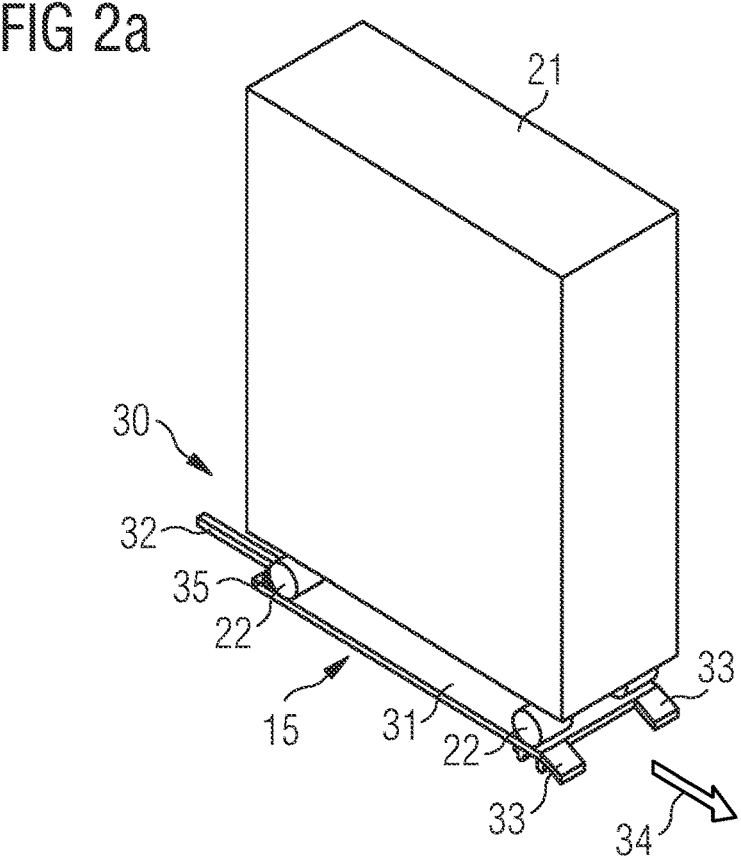
FIG. 2a and FIG. 2b show the supply containers on the trolley parking location with a stowage and removal system according to the invention.

FIG. 1 shows an accommodation space 10 with two supply containers 20 and 21 arranged one behind the other on two trolley parking locations 14 and 15 arranged one behind the other. By way of example, the vehicle in this exemplary embodiment is a passenger aircraft, and the rollable supply containers 20 and 21 are therefore in the form of trolleys, conforming to the Atlas standard. These are so-called "full-size trolleys," that is to say, trolleys with a full structural depth of approximately 80 cm. The accommodation space 10 is commonly fully closed and accessible via one insertion opening 13. It may be a constituent part of what is commonly referred to in the art as a galley. For the storage of the supply containers 20 and 21, these are inserted into the accommodation space 10 via the insertion opening 13 (indicated by an arrow symbol). In the accommodation space 10 that is shown, the rear trolley parking location 15 is provided such that the rear supply container 21 runs with its rear container wall 24 adjacent to, or so as to adjoin, the rear wall 11 of the accommodation space 10. The front trolley parking location 14 and the rear trolley parking location 15 are oriented along a common longitudinal axis 25. The front supply container 20 is thus positioned exactly in front of the rear supply container 21, such that the removal of the rear supply container 21 from the storage position is possible only when the front supply container 20 has been removed and thus the front trolley parking location 14 is free. Access via the insertion opening 13 to the rear trolley parking location 15 is difficult, or is even not possible without auxiliary means, owing to the limited arm's reach in the case of handling performed by the flight attendants. Even if this arrangement of trolley parking locations in a passenger aircraft is not preferred from the aspect of operability, structural constraints may however contribute to optimized space utilization in the limited space of a passenger aircraft if such supply containers can also be arranged one behind the other.

According to the invention, in order to permit the removal or else the parking of the supply container 21 on the rear parking location 15, a stowage and removal system 30 is provided for this parking location 15. The stowage and removal system 30 is installed in the floor region, below the supply container 21. It is substantially the case that a transfer plate 31 is provided which is designed such that it can be pulled out and which thus permits the loading and removal of the supply container 21 at a position which is comfortable for the flight attendants. A detailed description of the stowage and removal system 30 will be given below on the basis of FIGS. 2 to 5.

Figure 2B:
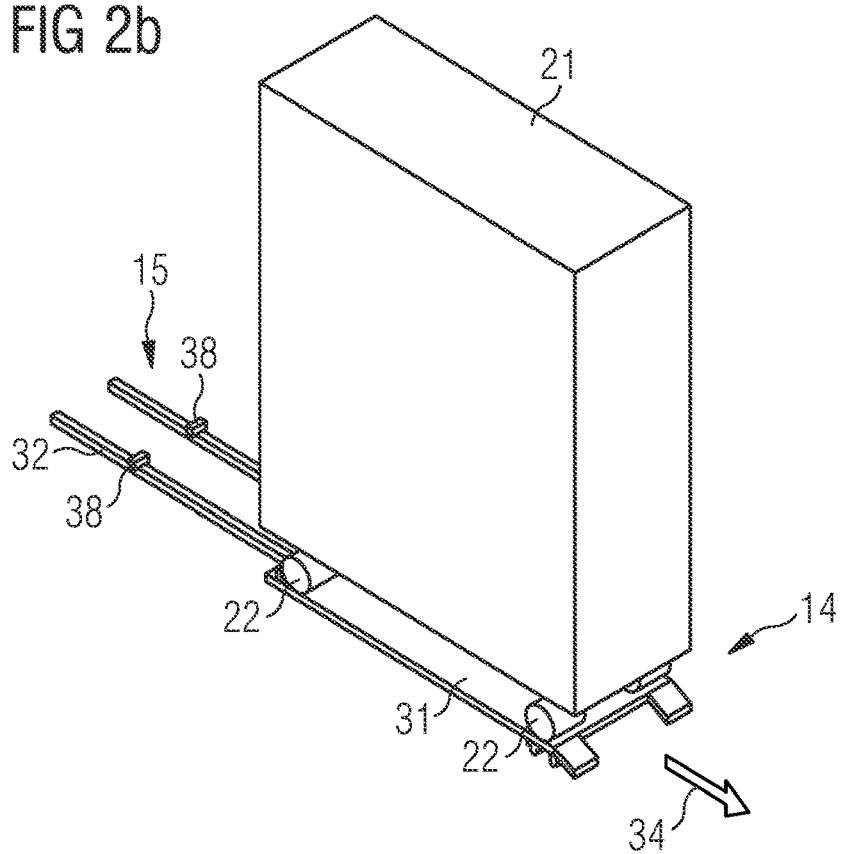

The stowage and removal system 30 according to the invention will become somewhat clearer in FIGS. 2a and 2b in a perspective illustration of the supply container 21 on the trolley parking location 15. FIG. 2a shows the supply container 21 in the storage position. The supply container 21 stands on a transfer plate 31, which is mounted movably on a rail system 32 and which can be moved in a removal direction 34. The rail system 32 is fixed in the floor region of the accommodation space 10 (see FIG. 1). This may, in the case of the design as a trolley parking location in a galley, be provided directly on the aircraft floor within the galley or else on the floor belonging to the accommodation space 10. The transfer plate 31 has, in the front region, run-on ramps 33 which enable the rollers 22 of the supply container 21 to move onto the transfer plate 31 and run off the latter again. In the storage position, the rear rollers 22 of the supply container 21 may move against a stop 35, which defines the storage position and prevents the transfer plate 31 from rolling over it. FIG. 2b shows the supply container 21 in the removal position. For this purpose, the transfer plate 31 is moved on the rail system 32 in the removal direction 34 as far as the front end position and is at least partially positioned on the front trolley parking location 14. For this purpose, front locking elements 37 (shown in FIG. 4) are provided at a front end stop 39 (shown in FIG. 4). As can be seen, on the rail system 32, there are provided rear end stops 38 which, in operative connection with rear locking elements 36 (to be shown later) hold the transfer plate 31 fixed in the storage position.

Figure 3A:
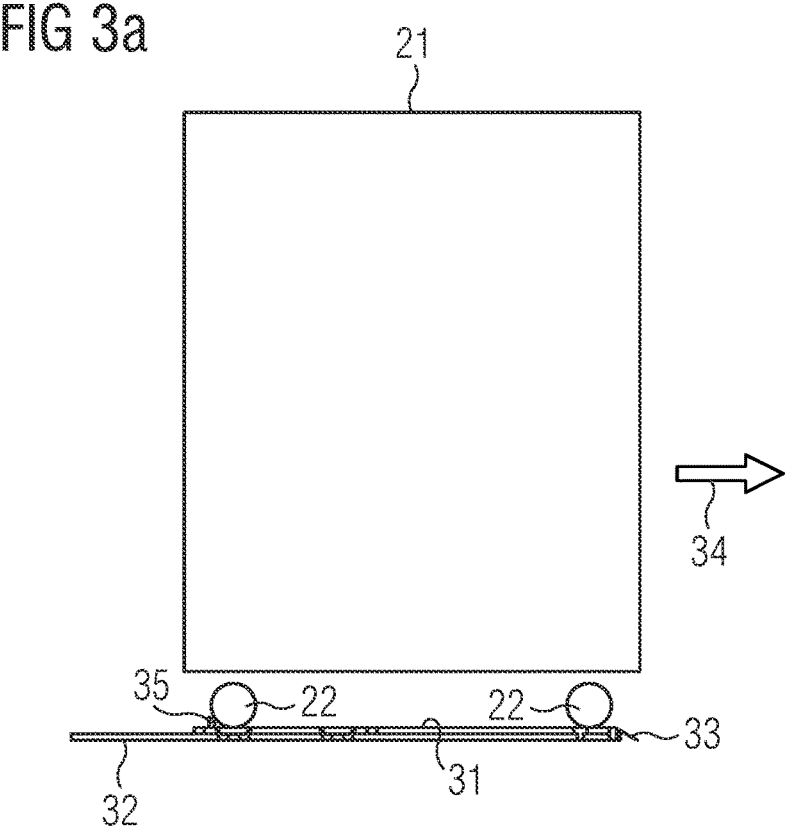
FIGS. 3a and 3b show the supply container on a transfer plate in a view from the side in a storage position and in a removal position.
Figure 3B:
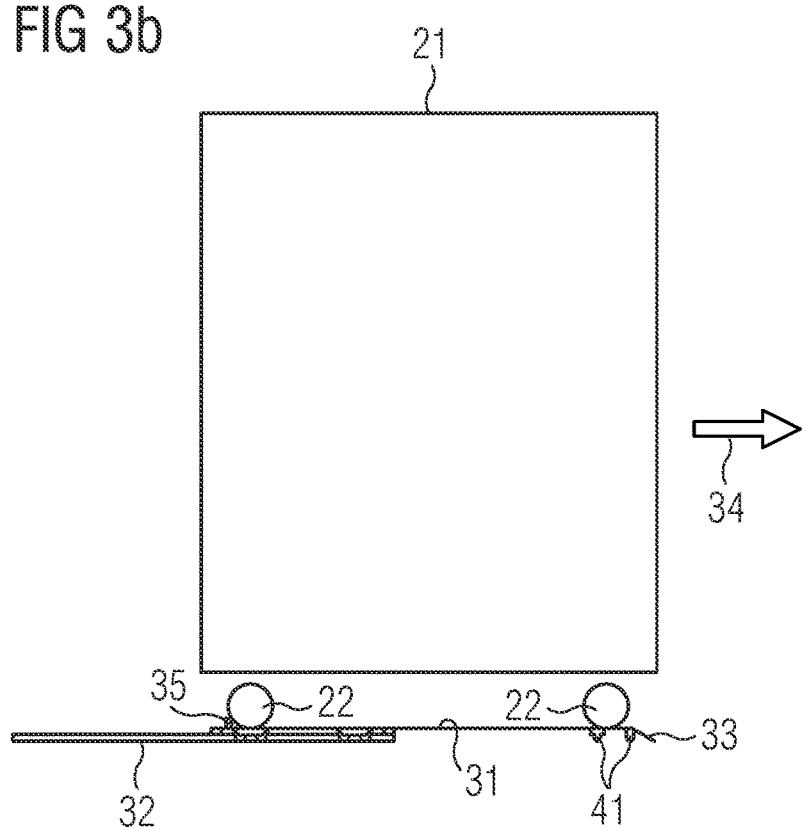

FIGS. 3a and 3b show, in a side view, the supply container 21 positioned on the transfer plate 31 in the storage position and in the removal position. The rail system 32 is in the form of a linear guide system, the guide rails of which are of flat construction. The structural height of the rails lies in a range from 5 to 20 mm. It is thus ensured that the run-on height onto the transfer plate 31 can be selected such that the handling of commonly fully laden and thus heavy rollable supply containers remains manageable by means of the run-on ramps 33. FIG. 3a illustrates the storage position. The supply container 21 is positioned on the transfer plate 31 and the rear rollers 22 of the supply container 21 are in abutment against the rear stop 35 of the transfer plate 31 in order to ensure that the supply container 21 stands securely on the transfer plate 31.

FIG. 3b shows the supply container 21 in the removal position, that is to say, the transfer plate 31 has been moved in the removal direction 34 by means of the rail system 32. In order to ensure a secure holding action and a movement capability of the transfer plate 31 even beyond the guide rails of the rail system 32, roller elements 41 are arranged in the front region of the transfer plate 31.

Figure 4A:
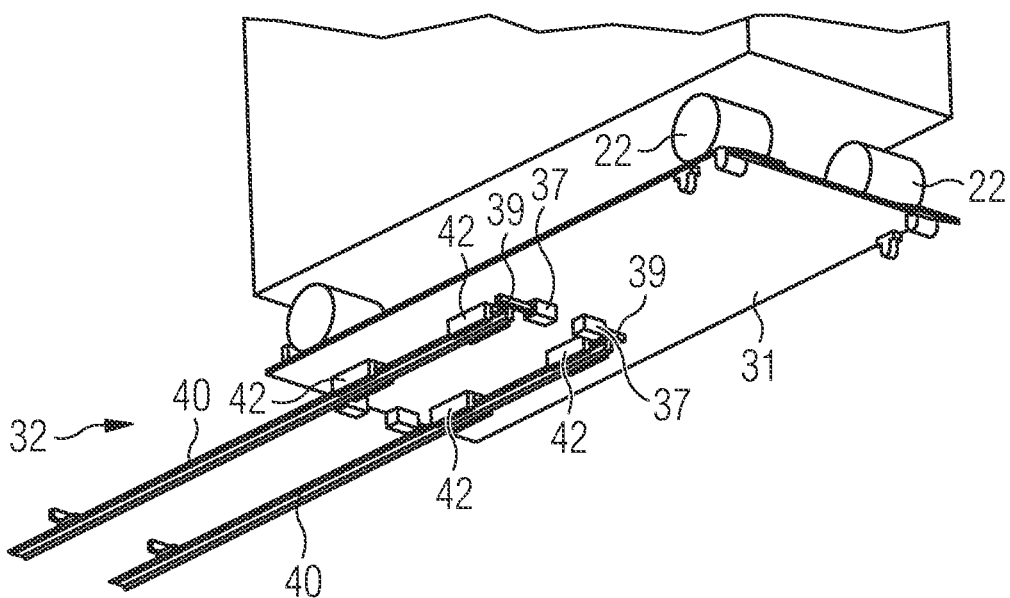
FIGS. 4a and 4b show, in detail views, the supply container arranged on the stowage and removal system in the removal position.
Figure 4B:
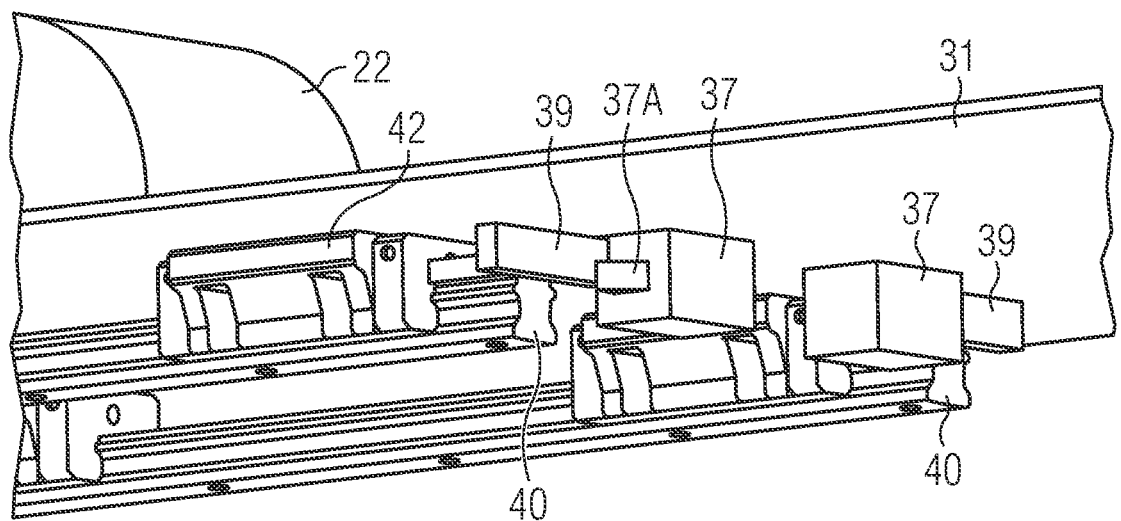

Detail views of the supply container 21 arranged on the stowage and removal system 30 in the removal position and an advantageous embodiment of the rail system 32 and the functioning thereof are illustrated in FIGS. 4a and 4b.

FIG. 4a shows, in a view from below, the rail system 32 arranged below the transfer plate 31. The movement bodies 42 running on guide rails 40 are fastened to the transfer plate 31. The guide rails 40 are preferably designed as linear guide rails, wherein telescopic rails may also be used. At a front end stop 39, in each case fastened to the corresponding guide rail 40, locking of the position of the transfer plate 31 can be performed in order to then reliably permit a removal movement of the supply container 21 from the fixed transfer plate.

FIG. 4b shows, in a detail view, the guide rails 40, the respective movement body elements 42 and the front locking means 37. In this pulled-out position of the transfer plate 31 (insertion and removal position of the supply container 21), the front locking means 37, equipped, for example, with a snap-action catch 37A, has been moved beyond the front end stop 39 and locks the transfer plate 31 for the loading and unloading process.

FIG. 5 shows, in a view of the rear side of the supply container 21, the rear stop 35 for the rollers 22 for the positioning of the supply container 21. Here, the transfer plate 31 is in the foremost position of the rail system 32 on the guide rails 40. In this position, the transfer plate 31 can be moved, that is to say, from the pulled-out position shown (removal position), the transport plate 31 with the supply container 21 can be moved into the storage position by action of force, manually or else assisted by means of drives. As an end position of the transfer plate 31, rear end stops 38 are provided which interact with rear locking means 36 of the transfer plate 31.

Figure 6A:
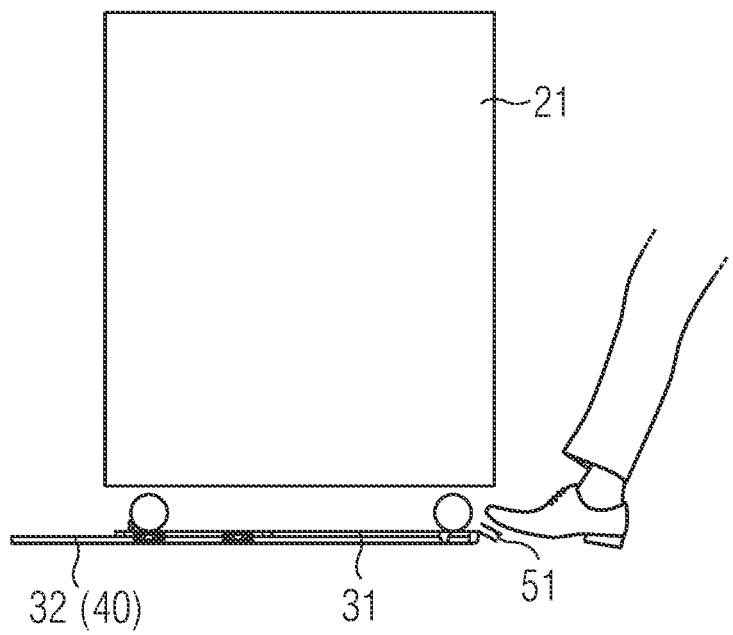
FIGS. 6a to 6c show a first embodiment of a locking device with mechanical cable pull actuation.
Figure 6B:
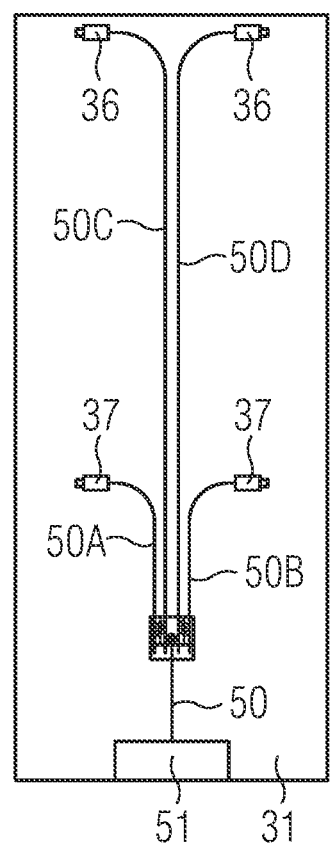
Figure 6C:
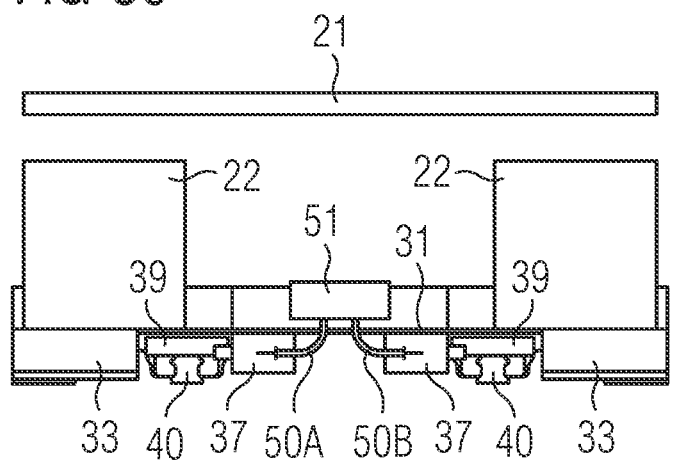

FIGS. 6a, 6b and 6c show the supply container 21 positioned on the transfer plate 31 in a side view, in a view from below, and in a view from the front, in a detail illustration. It can be seen in FIG. 6b that the transfer plate 31 is equipped, on the bottom side, with an embodiment of front and rear locking devices 37 and 36 which are actuated by means of at least one mechanical cable pull 50, preferably four cable pulls 50A, 50B, 50C and 50D according to the exemplary embodiment shown. The cable pulls 50 are preferably designed in the manner of Bowden cables and may be actuated, for example, by means of a foot-operated pedal 51 and thus lock and unlock the locking means. An alternative actuation of the cable pulls 50 may also be a lever element which is provided for being operated by hand (not shown). It is also conceivable for the rear locking means 36 to be used optionally, that is to say, it is also possible for these to be omitted.

In FIG. 6c, it can be seen in a detail illustration in a view from the front that the front two catch elements 37 are actuated by means of the respective cable pull 50A and 50B, and this is made possible by means of the actuation of the schematically illustrated foot-operated pedal 51.

FIGS. 7a and 7b show a second embodiment of an actuation and locking device. FIG. 7a shows, in a side view, that operation may be performed by foot-operated pedal 51 in order to release the locking. In FIG. 7b, it is schematically shown that the foot-operated pedal 51 can actuate the locking elements 37' in the manner of electromechanical actuation. Signal lines 52 may be used for this purpose, though wireless actuation may also be performed.

Figure 8A:
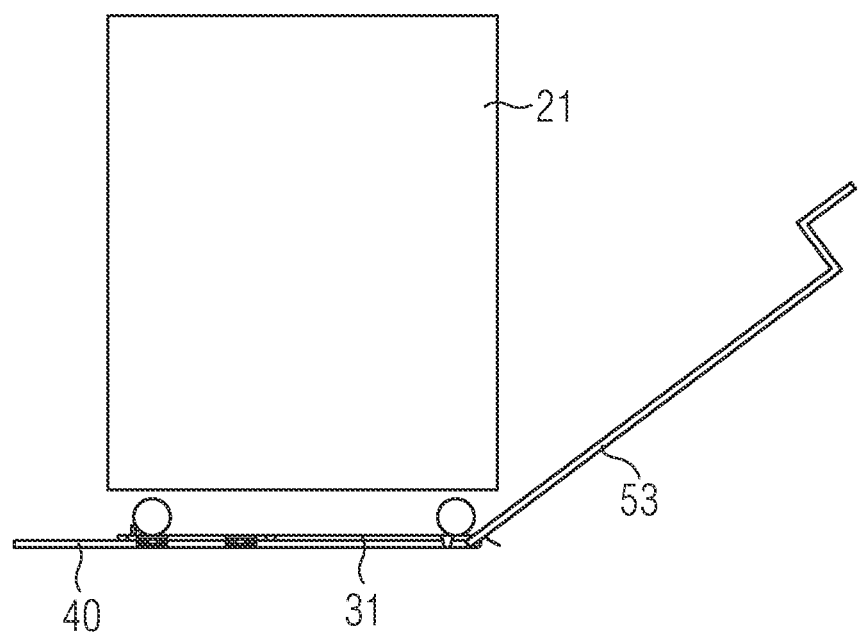
FIGS. 8a and 8b show a third embodiment of a locking device with mechanical actuation.
Figure 8B:
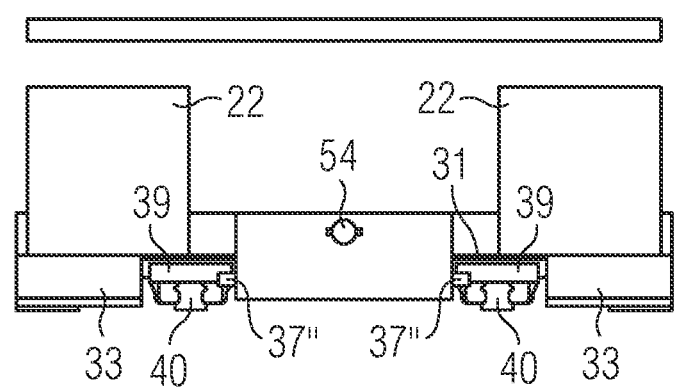

FIGS. 8a and 8b show a third embodiment of a locking device with mechanical actuation in a schematic illustration. Here, provision is made whereby a hand crank 53 engages into a lock element 54 and, by rotation in the lock element 54, actuates the locking element 37'' or multiple locking elements 37''. With the use of the hand crank 53, it is also possible, after the engagement or rotation in the lock element 54, for an introduction of load into/action of force on the transfer plate 31 to be performed at the same time, and thus for the plate to also be moved.

FIG. 9 shows a further embodiment of a stowage and removal system. The accommodation space 10 is shown, with two trolley parking locations 14 and 15 arranged one behind the other. These trolley parking locations 14 and 15 serve for accommodating the rollable supply containers 20 and 21 (shown in FIGS. 11a to 11c). The accommodation space 10 is commonly fully closed and accessible via the insertion opening 13. For the storage of the supply containers 20 and 21, these are inserted into the accommodation space 10 via the insertion opening 13 (indicated by an arrow symbol). In the accommodation space 10 that is shown, the rear trolley parking location 15 is provided such that the rear supply container 21 is positioned with its rear container wall 24 at a stop 18 adjacent to, or adjoining, the rear wall 11 of the accommodation space 10. The front trolley parking location 14 and the rear trolley parking location 15 are oriented along a common longitudinal axis. The front supply container 20 is thus positioned exactly in front of the rear supply container 21, such that the removal of the rear supply container 21 from the storage position is possible only when the front supply container 20 has been removed and thus the front trolley parking location 14 is free.

According to the invention, in order to permit the removal or else the parking of the supply container 21 on the rear parking location 15, a stowage and removal system 30A is provided for this parking location 15. This stowage and removal system 30A is arranged in the floor region. It is substantially the case that a transfer plate 31A is provided which is movable on a rail system 32A. The transfer plate 31A can be moved on the rail system 32A as far as the insertion opening 13 and thus permit the loading and removal of the supply container 21 at a position which is comfortable for the flight attendants. A detailed description of the stowage and removal system 30A will be given below on the basis of FIGS. 10 to 12.

Figure 10B:
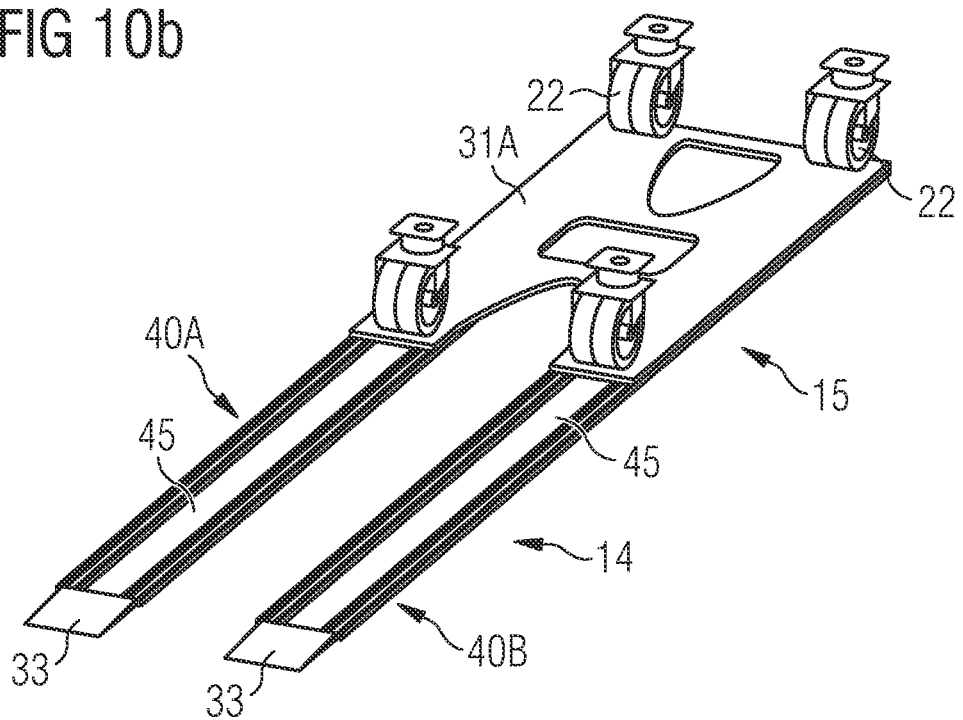
Figure 10C:
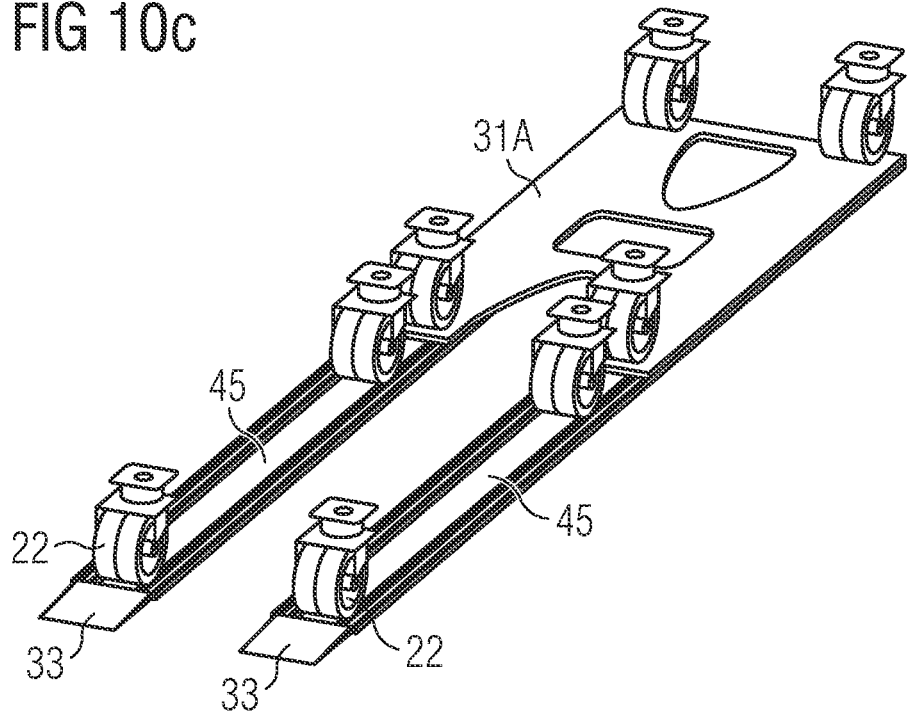

FIGS. 10a to 10c show the stowage and removal system 30A as per FIG. 9 in different loading and parking locations. In each case, the transport rollers 22 of the supply containers 20 and 21 (not shown) are indicated.

The rail system 32A has guide rails 40A and 40B which are positioned so as to run in each case approximately perpendicularly beneath the transport rollers 22. In this context, the expression "approximately perpendicularly" means that they run such that the guide rail 40A or 40B cannot be directly rolled over by the transport rollers 22, but are arranged as close as possible to the load introduction points of the transport rollers 22. On the one hand, the transfer plate 31A, or cover elements 45, serve as running surface for the transport rollers 22 in the region of the top side of the guide rails 40A or 40B. Preferably, the respective guide rail 40A or 40B is, as guide rail 40, equipped with two longitudinal rails 40AA and 40AA' and 40BB and also 40BB' which run parallel, wherein, between the longitudinal rails 40AA and 40AA' and 40BB and also 40BB', in each case one base body acts as cover element 45. In FIG. 10A, the transfer plate 31A is positioned in the region of the insertion opening. Run-on ramps 33 are fixed in the floor region 16 at a corresponding location in order to enable the supply container 21 to run onto the transfer plate 31A. The transfer plate 31A can then, with the supply container 21 positioned thereon, be displaced onto the rear parking location 15 (see FIG. 10B). The guide rails 40A and 40B, which, for the movement of the transfer plate 31A, run as far as into the region of the insertion opening 13, are in this embodiment of the rail system provided in the region of the front parking location 14 with a cover 45 as a storage and running body for the transport rollers 22 of the front supply container 20. In the embodiment shown, the cover element 45 is provided between the longitudinal rails 40AA and 40AA' and also 40BB and 40BB'. The cover element serves for compensating for the height difference from the floor 16 to the top side of the rails 40A and 40B, and, by means of the run-on-ramp 33, the rollers of the front supply container 20 can roll onto the running surface of the storage and running body 45 (see FIG. 10c).

Figure 11B:
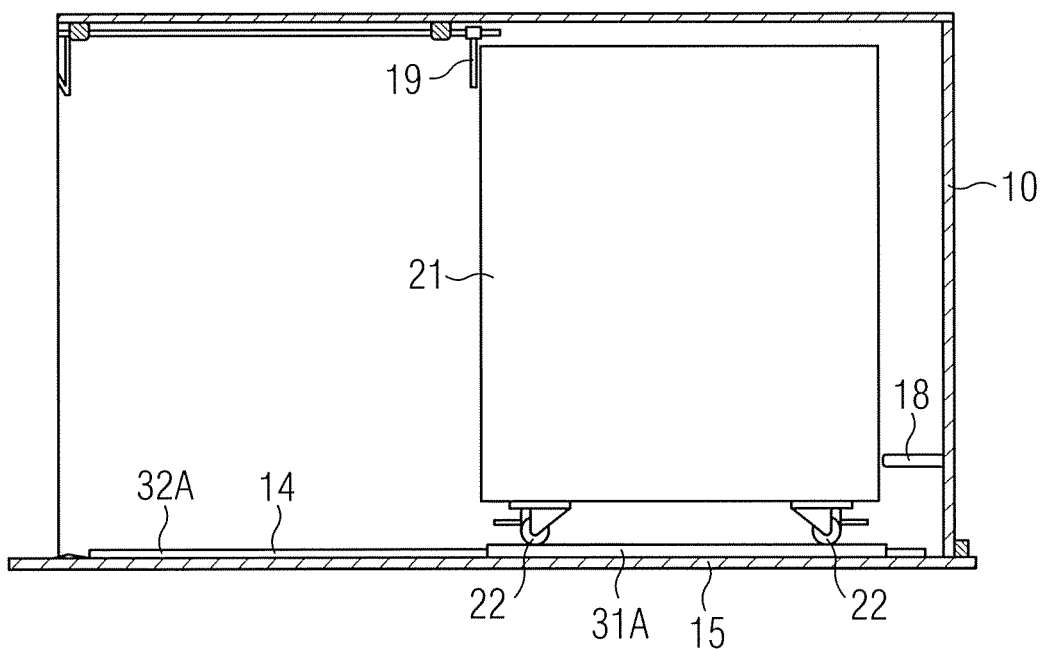
Figure 11C:
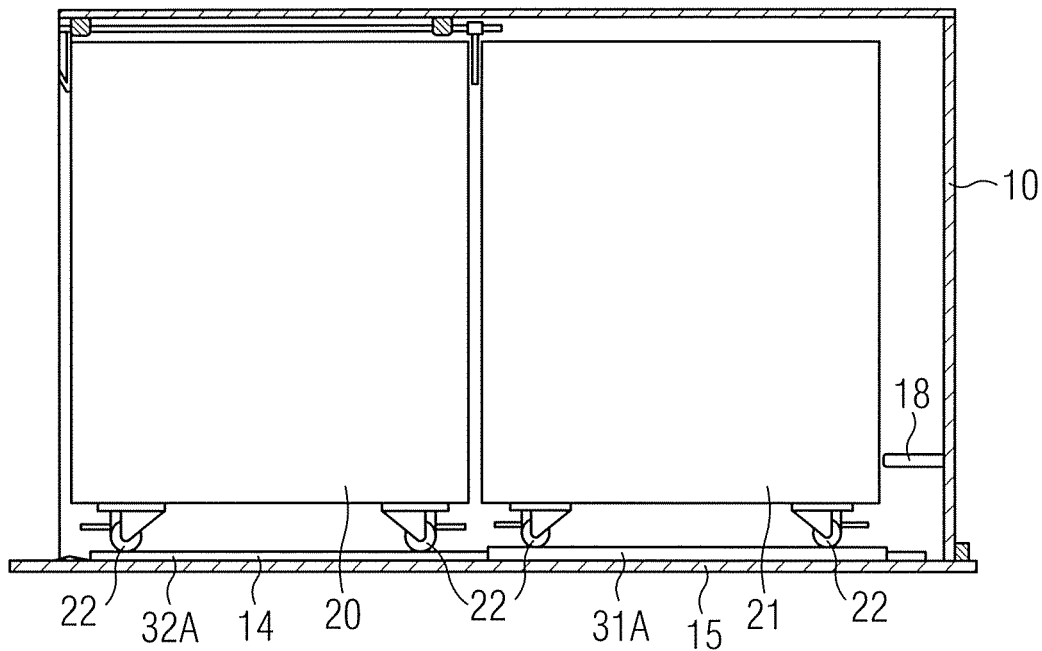

FIGS. 11a to 11c show the accommodation space 10 as per FIG. 9 in different loading and parking positions of the two supply containers 20 and 21 arranged one behind the other. In FIG. 11a, the insertion and removal position of the supply container 21 is shown. The supply container 21 is, during the insertion, pushed onto the transfer plate 31A. Detail A shows the run-on ramp 33 which is required to overcome the height difference between the floor 16 and the transfer plate 31A. The run-on ramp may, for this purpose, be of beveled design on one side or else (as shown) on both sides. For the positioning and locking of the transfer plate 31A, locking devices are provided. Such locking devices may, for example, be designed as already described in detail with regard to the first embodiment of the stowage and removal system (see FIGS. 4 to 8). It can be seen in the detail B that, for the movement of the container 21 onto the transfer plate 31A, a catch element 19 is provided as a stop. A solution with the same action is realized in the first embodiment with the stop 35 on the transfer plate 31. The catch element 19 is, in this second embodiment, arranged in the ceiling region of the accommodation space 10 and, after the positioning of the container 21, is rotated in order to permit the movement of the transfer plate 31a to the rear parking location 15. Here, the insertion of the container 21 is limited at the rear wall of the accommodation space 10 by a stop 18. FIG. 11B shows this position of the rear container 21. FIG. 11C shows the accommodation space 10 with the two containers 20 and 21 positioned one behind the other. As can already be seen in FIG. 10C, the rear container 21 is mounted on the transfer plate 31A, and the front container 20 stands with its rollers 22 on the storage and running bodies 45.

Figure 12:
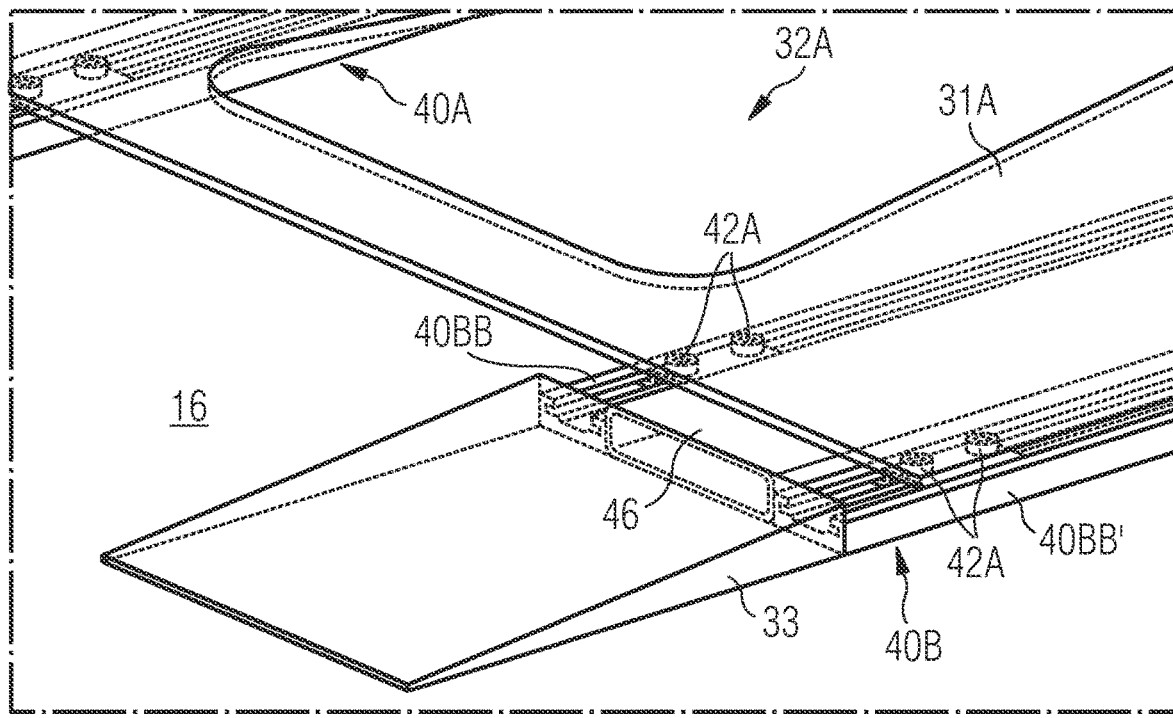
FIG. 12 shows, in a detailed view, the rail system according to the second embodiment.

FIG. 12 shows a detail view of the rail system 32A according to the second embodiment in the region of the face-side end of the guide rails 40A and 40B which is designed for the insertion and removal of the containers 20 and 21.

At a face side of the two longitudinal rails 40BB and 40BB', run-on ramps 33 are arranged at a corresponding position on the floor 16. When the transfer plate 31A has been displaced rearward, access is made possible to the flat body 46 provided, as an embodiment of a cover element, between the two longitudinal rails 40BB and 40BB'. Movement bodies 42A are provided on the transfer plate 31A, which movement bodies are displaceable in the longitudinal rails. The cover element or the flat body 46 is formed as an insert piece between the rails as a support and running body 46 for the transport rollers 22 of the front container 20. The height is adapted to the height of the running rails 40BB and 40BB'.

By means of the components shown, it is consequently possible to realize a simple but nevertheless highly effective stowage and removal system which can greatly increase the compactness of a galley or of other facilities, because a parking location with sufficient depth can be filled with multiple trolleys one behind the other without the need to allow for limitations arising from the handling of a user of average physical size.

Figure 13:
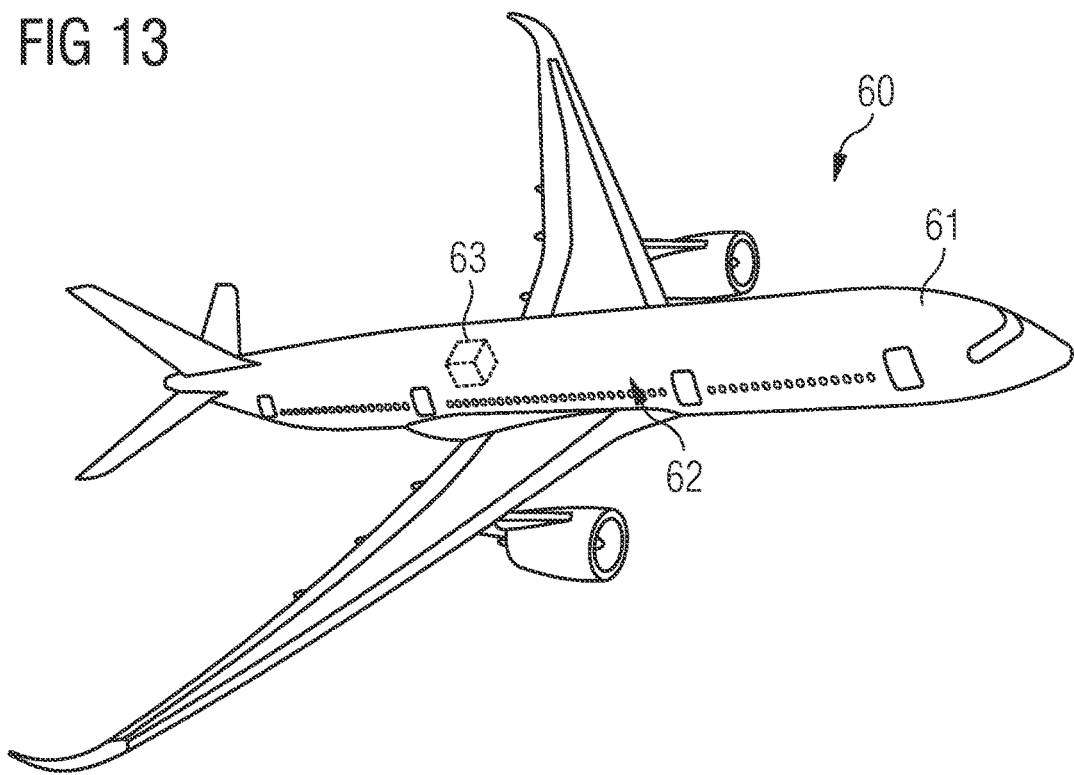
FIG. 13 shows an aircraft having a cabin in which there is arranged a galley with an accommodation space equipped with a stowage and removal system according to the invention.

Finally, FIG. 13 shows an aircraft 60 with a fuselage 61 and with a cabin 62 which is formed therein and in which there may be arranged a cabin monument 63 which has an accommodation space 10 for supply containers and which is equipped with a stowage and removal system 30 or 30A according to the invention.

It is additionally pointed out that features that have been described with reference to one of the above exemplary embodiments may also be used in combination with other features of other exemplary embodiments described above.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "having," "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A stowage and removal system for an accommodation space for storing one or more rollable containers in a vehicle, having:
    a rail system in a region of a floor of the accommodation space,
    a transfer plate which is movable on the rail system in the floor region of the accommodation space and which assumes a storage position and a removal position for the container,
    wherein the storage position of the container is provided in a region of a rear wall of the accommodation space and the removal position is provided in a region of an insertion opening, arranged oppositely in relation to the rear wall, for an insertion and removal of a container equipped with transport rollers into the accommodation space, the rail system has guide rails which are arranged on the floor of the accommodation space in a movement direction of the transfer plate and run from the insertion opening as far as into a region of the rear wall, and movement bodies which engage into the guide rails are arranged on the transfer plate.

2. A system according to claim 1, wherein the accommodation space is, for purposes of accommodating at least two containers arranged one behind the other, formed with a front parking location and a rear parking location, wherein a rear container of the two containers is positioned on the transfer plate.

3. The system according to claim 1, wherein the guide rails are positioned such that they run in each case approximately vertically below the transport rollers, and in each case, one cover element is provided, as a running surface for the transport rollers, in a region of a top side of the guide rails at least in the accommodation space of a front parking location.

4. The system according to claim 1, wherein the transfer plate has at least one locking device for releasably locking the transfer plate for the removal position.

5. The system according to claim 4, wherein the at least one locking device is mechanically or electromechanically actuatable.

6. The system according to claim 1, furthermore having at least one positioning device of the container on the transfer plate.

7. The system according to claim 3, wherein run-on ramps onto the transfer plate or the cover elements for the guide rails are arranged at a face side of the guide rails at a corresponding position on the floor.

8. A stowage and removal system for an accommodation space for storing one or more rollable containers in a vehicle, having:

a rail system in a region of a floor of the accommodation space, a transfer plate which is movable on the rail system in the floor region of the accommodation space and which assumes a storage position and a removal position for the container, wherein the storage position of the container is provided in a region of a rear wall of the accommodation space and the removal position is provided in a region of an insertion opening, arranged oppositely in relation to the rear wall, for an insertion and removal of a container equipped with transport rollers into the accommodation space, the rail system has guide rails which are arranged on the floor of the accommodation space in a movement direction of the transfer plate and run from the insertion opening as far as into a region of the rear wall, and movement bodies which engage into the guide rails are arranged on the transfer plate, wherein the guide rail has two longitudinal rails which run parallel, wherein, between the longitudinal rails, a storage and running body acts as cover element.

9. A vehicle comprising:

a cabin, a cabin monument which is situated therein, and the stowage and removal system according to claim 1.

10. The vehicle according to claim 9, wherein the vehicle is a passenger aircraft.

\* \* \* \* \*